US007868287B2

(12) United States Patent
Fry et al.

(10) Patent No.: US 7,868,287 B2
(45) Date of Patent: Jan. 11, 2011

(54) HIGHLY DIFFUSE REFLECTOR

(75) Inventors: Edward S. Fry, College Station, TX (US); Joseph A. Musser, College Station, TX (US); Jeffrey Katz, College Station, TX (US); William C. Merka, College Station, TX (US); George W. Kattawar, College Station, TX (US); Zheng Lu, College Station, TX (US)

(73) Assignee: The Texas A&M University System

( * ) Notice: Subject to any disclaimer, the term of this patent is extended or adjusted under 35 U.S.C. 154(b) by 668 days.

(21) Appl. No.: 11/895,955

(22) Filed: Aug. 28, 2007

(65) Prior Publication Data

US 2008/0231958 A1      Sep. 25, 2008

Related U.S. Application Data

(60) Provisional application No. 60/841,045, filed on Aug. 30, 2006.

(51) Int. Cl.
*G01J 1/00* (2006.01)
(52) U.S. Cl. .................................. 250/228; 250/227.23
(58) Field of Classification Search .................. 250/228, 250/227.32, 227.11, 551; 362/227–243, 362/800, 612–614
See application file for complete search history.

(56) References Cited

U.S. PATENT DOCUMENTS

| 4,232,971 | A | * | 11/1980 | Suga ........................... 356/446 |
| 4,912,720 | A |   | 3/1990 | Springsteen |
| 5,781,342 | A |   | 7/1998 | Hannon et al. |
| 5,982,542 | A |   | 11/1999 | Hannon et al. |
| 6,015,610 | A |   | 1/2000 | Minor et al. |
| 6,809,149 | B2 |   | 10/2004 | Meyer et al. |
| 2006/0038470 | A1 |   | 2/2006 | Maul et al. |

OTHER PUBLICATIONS

Musser, Joe; Particle Sizing via Direct Forward Scattering, Jun. 20-22, 2005 Scientific Conference on Obscuration & aerosol Research Non-enabling; slides 17-23.

* cited by examiner

*Primary Examiner*—Que T Le
(74) *Attorney, Agent, or Firm*—Jennifer S. Sickler; Gardere Wynne Sewell LLP

(57) ABSTRACT

The invention relates an apparatus and method for forming a diffuse reflector. In one embodiment of the invention, a diffuse reflector is formed by exposing transmissive particles of a pre-determined purity to pressure and forming a material having desired diffuse reflective properties. The transmissive particles may further be thermally treated, such as by sintering, to form material having desired diffuse reflective properties. The treated transmissive particles may then be disposed in a vessel and define a cavity therein to form an integrated cavity diffuse reflector.

6 Claims, 4 Drawing Sheets

HIGHLY DIFFUSE REFLECTOR

CROSS-REFERENCES TO RELATED APPLICATIONS

This application claims benefit of U.S. Provisional Patent Application Ser. No. 60/841,045, filed on Aug. 30, 2006, which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of the Bioaerosol Sampling and Collection grant, contract DAAD 13-03-C-0050 awarded by the US Army/RDECOM, Edgewood Chemical and Biological Center and the grant OCE 0099242 from the National Science Foundation.

BACKGROUND OF THE INVENTION

1. Field of the Invention

The present invention relates to optical reflectors and methods for producing the same.

2. Background of the Art

Special light reflectant surfaces are used in a variety of applications requiring light energy to be close to completely reflected while providing an even distribution of light from the surface. While good-mirrored surfaces can provide nearly perfect reflectivity of visible light, the light energy exiting these surfaces does so only at an angle equal to the incident angle of light contact. For many applications it is important that light be reflected with an even distribution of light from the surface. This latter property is referred to as diffuse or "Lambertian" reflectance.

In one application, laser or integrating cavities are being made with diffusely reflecting material. Diffusely reflecting material is preferably used in laser cavity applications to more uniformly spread energy from the flash lamp or other exciting means into the lasing material. A diffuse reflecting medium has the advantage of not limiting a laser cavity to a shape with focal points, opening the field to new laser cavity configurations.

The requirement for a highly efficient laser having a cavity made of diffusely reflecting material has resulted in the "Kigre" cavity which is a cavity defined by a glass layer formed over barium sulfate and which generally results in a 97% diffuse reflectivity. It has been found that such cavities degrade quickly over time and usage, usually by yellowing. Cavities have been made of a gold or silver coating. However, these cavities have resulted in only 94% to 95% specular reflectivity.

Materials commonly used as a diffuse reflector include a polyester material or a polytetrafluoroethylene (PTFE) material. One such PTFE material is Spectralon®, by Labsphere, which reports the highest diffuse reflectivity. It is made of the same material as in Teflon®, and the material is processed carefully to optimize its diffuse reflectivity. Unfortunately, such PTFE based material degrades under exposure to ultraviolet light. Additionally, such PTFE based materials do not retain the same diffuse reflectivity properties in the ultraviolet range as in other wavelength ranges, and thereby limit the applications. Additionally, such PTFE films have been observed to have less than the desired diffuse reflectivity for current and future optical applications.

Therefore, there is a need for developing materials and structures from such materials with improved diffuse reflectivity.

BRIEF SUMMARY OF THE INVENTION

The present invention is directed to an apparatus and method for forming a diffuse reflective material that may be used in a diffuse reflector. In one embodiment of the invention, a method is provided, including providing a plurality of optically transmissive particles having a material purity of about 99.8 wt. % or greater, exposing the plurality of optically transmissive particles to a pressure between about 30 psi and about 200 psi, and exposing the plurality of optically transmissive particles to a thermal process.

In another embodiment, a method for forming a diffuse reflector is provided including providing a first vessel and a second vessel, forming a diffuse reflective material by a process including providing a plurality of optically transmissive particles having a material purity of about 99.8 wt. % or greater, exposing the plurality of optically transmissive particles to a pressure between about 30 psi and about 200 psi, and exposing the plurality of optically transmissive particles to a thermal process, and disposing a first portion of the diffuse reflective material in the first vessel and disposing a second portion of the diffuse reflective material in the second vessel, and coupling the first vessel and the second vessel together with the first portion of the diffuse reflective material and the second portion of the diffuse reflective material defining a cavity between the first and second portions of the diffuse reflective material.

In another embodiment, a reflector is provided including a first vessel and a second vessel defining a first cavity there between and a diffuse reflective material disposed in the first cavity to define a second cavity at the center of the diffuse reflective material disposed in the first cavity, and the diffuse reflective material comprises a reflectivity of 0.997 or greater at 266 nanometer wavelengths or longer formed from a plurality of transmissive particles having a purity of about 99.8 wt. % or greater and each particle of the plurality of the optically transmissive particles have a surface area of between about 10 $m^2/g$ and about 380 $m^2/g$.

BRIEF DESCRIPTION OF THE DRAWINGS

A description of the invention, briefly summarized above, may be had by reference to the following detailed description and to the appended drawings. The appended drawings illustrate the preferred embodiment, and some other possible embodiments of the invention, and are therefore not to be considered as limiting the scope of the invention.

DETAILED DESCRIPTION OF THE INVENTION

Figure 1:
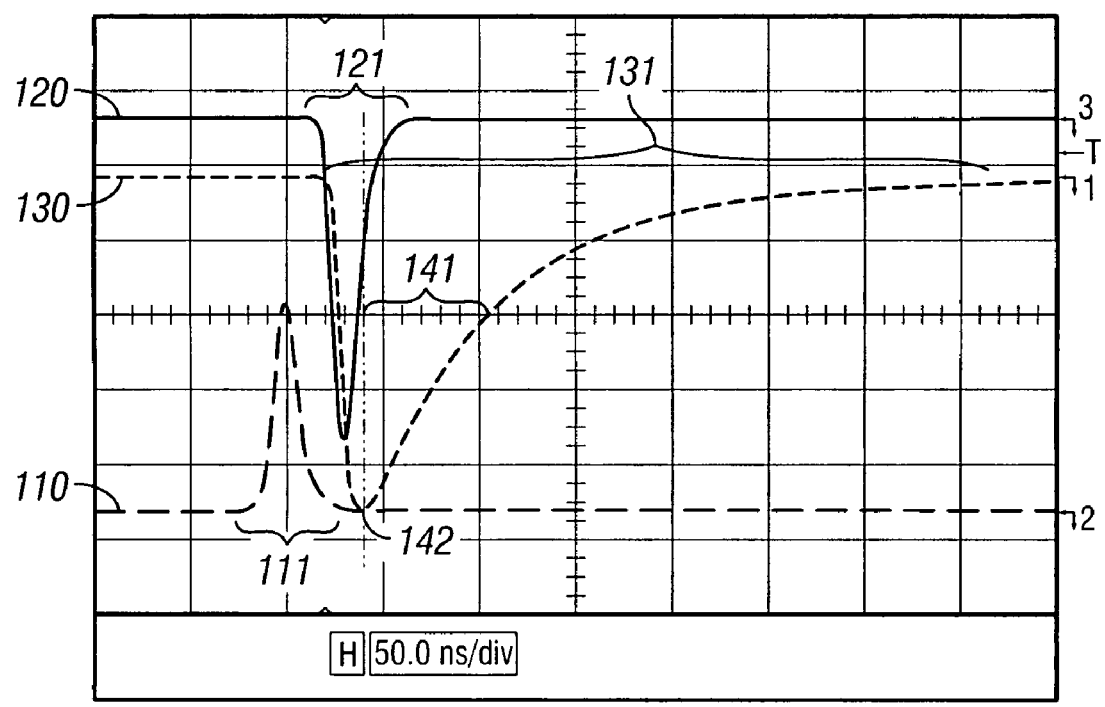
FIG. 1 is a chart illustrating one embodiment of laser pulse widths during a laser triggering sequence.

The present invention is directed to an apparatus and method for forming a reflector and a diffuse reflective material. In one embodiment of the invention, a diffuse reflector material with a high reflectivity is formed by exposing an optically transmissive material of high purity to pressure, and optionally, increased temperature, to form a material having desired diffuse reflective properties. In one embodiment of a reflector, the treated transmissive material may then be disposed in a first cavity between two plates or vessels with the transmissive materials forming a second cavity therein to produce an integrated cavity diffuse reflector (also referred to as a Lambertian reflector).

A diffuse reflector is broadly defined as a reflector that provides for an even distribution of light reflected from the surface. A transmissive material is broadly defined as a transparent material which light passes through with a transmission of about 0.96 or greater at a wavelength or wavelengths of interest. For example, fused silica, a material with similar transmissive properties as fumed silica, has a transmission of over 0.99997 at 600 nm, 0.99994 at 500 nm, 0.9995 at 400 nm, 0.998 at 300 nm and 0.96 at 200 nm. A diffuse reflective material is broadly defined as a material that reflects light in an amount proportional to the cosine of the angle of reflection, and thus, provides a uniform radiance when viewed from any angle.

Suitable transmissive materials may include a silicon-based material, an inorganic fluorine-based material, or combinations thereof, to form the diffuse reflective material. The silicon-based material may comprise any silicon oxide material including quartz, fumed silica, or combinations thereof. In one embodiment of the silicon-based materials, the materials may have a silicon oxide purity between about 99 wt. % and about 100 wt. %. Suitable silicon-based materials have silicon oxide purity between about 99.8 wt. % and about 100 wt. %, including between about 99.98 wt. % and about 100 wt. %, for example, a material having about 5 parts per million (ppm) of impurities in the silicon oxide material. Examples of suitable quartz materials include materials sold under the Aerosil brand name, Aerosil EG50, Aerosil 90, and Aerosil 380, sold by Degussa AG of Germany. A silicon-based material, Quartz Powder, made by Pegasus Glassware Inc., of Stirbridge, Mass., may also be used.

Alternatively, an inorganic fluorine-based material may be used for the processes and apparatus described herein. The inorganic fluorine-based material may be salts of fluorine and Group I and Group II metals, such as calcium, magnesium, and lithium. For example, the inorganic fluorine-based material may be selected from the group consisting of calcium fluoride, magnesium fluoride, lithium fluoride, and combinations thereof. The inorganic fluorine-based material may have a metal fluoride purity between about 99 wt. % and about 100 wt. %. Suitable fluorine-based materials have metal fluoride purity between about 99.8 wt. % and about 100 wt. %, including between about 99.98 wt. % and about 100 wt. %, for example, a material having about 5 parts per million (ppm) of impurities in the fluorine-based material. Alternatively, a combination of the above transmissive materials may be use for the processes and apparatus described herein.

The transmissive material may be a particulate material, either particles and/or agglomerates of particles, which particles may have an average particle diameter between about 10 nanometers (nm) and about 70 nanometers, such as between about 30 nm and about 50 nm, for example about 40 nm. Aggregates of the particles having a size of about 1 micron or greater may be used in the processes and apparatus described herein. The transmissive material particles may be of any shape and each particle may have a surface area between about 1 $m^2/g$ and less than about 380 $m^2/g$, such as between about 10 $m^2/g$ and about 90 $m^2/g$, for example between about 50 $m^2/g$ and about 90 $m^2/g$. The diffuse reflector material from the transmissive materials may be used in the form of particles, agglomerates of particles, or be formed into larger structures, such as disks or shaped structures, for examples, a sphere, a cylinder, or a block.

The transmissive material, a plurality of particles and/or agglomerates, may be subjected to a pressure between about 30 psi and about 200 psi, such as a pressure between about 30 psi and about 100 psi, for example, about 38.5 psi, to form a diffuse reflector material. It is believed the pressure applied to the transmissive material increases the mechanical stability of the particulates while minimizing optical contact between the particles that retains the air voids between the particles, and thus, retains the index of refraction change, allowing for reflecting the light.

The transmissive material, a plurality of particles and/or agglomerates, may also be exposed to a thermal process when a pressure is applied to the transmissive materials. One thermal process is flame treating the transmissive materials. The flame treatment comprises exposing the material to a flame that provides sufficient heat at about the melting temperature of the transmissive materials, for example, about 1600° C. for quartz, for a period of time to form a solid structure. The flame treatment process may be performed for a time sufficient to form a solid structure. It is believed the flame treatment of the silicon-based material would increase the mechanical stability while retaining the desired reflectivity of the material. It is believed that flame treating the surface of the reflector material will produce a solid shell that would support the reflector material while not deteriorating the optical properties of the device.

Alternatively, the transmissive material, a plurality of particles and/or agglomerates, may also be exposed to a thermal process, such as by a sintering process. In one example of a heat-treating process, the transmissive material is subjected to a sintering process to form an interconnected mass or solid structure without completely melting into a liquid state. Examples of sintering processing include exposing the material to temperatures of less than about the melting temperature of the transmissive materials, such as about 1600° C. for quartz, for a period of time to form a solid structure. The sintering process may be performed at temperatures between about 500° C. and about 1500° C., such as between about 750° C. and about 1200° C., for example, at about 1000° C., and at a pressure between about 20 psi and about 200 psi, such as between about 30 psi and about 100 psi, for example, between about 30 psi and about 50 psi. The sintering process may be performed from between about 30 minutes and about 4 hours. For example, fumed silica, Aerosil 90, was pressed with 100 psi and then heated while under the described pressure in an oven to 816° C. for three hours. Through the sintering process the fumed silica formed a self-supporting solid while retaining the diffuse reflectivity described herein.

The formed diffuse reflective material has been observed to have diffuse reflectivities of about 0.997 or greater at about 266 nm wavelengths or greater, such as diffuse reflectivities of between about 0.997 and about 0.999 at between about 250 nm and about 700 nm wavelengths, for example, a diffuse reflectivity of about 0.999 for wavelengths between about 400 nm and about 700 nm, and a diffuse reflectivity of about 0.997 for wavelengths between about 250 nm and less than 400 nm. The diffuse reflective material was observed to have an index of refraction between about 1.60 and about 1.40, for example, between about 1.50 and about 1.46.

In one embodiment of the diffuse reflector materials, the treated transmissive materials, fumed silica, was observed to have diffuse reflectivities of about 0.999 at about 532 nm wavelengths and about 0.997 at about 266 nm wavelengths, and an index of refraction between about 1.50 at 266 nm and about 1.46 at 532 nm. It has been observed that the observed reflectivities are a 90% decrease of the loss of reflectivity at 266 nm when compared to Spectralon®, a material made by Labsphere, which claims to be the world's highest diffuse reflector. Such a reduced loss of reflectivity may translate into an optical path length increase by a factor of nine (9) when the material is used to produce an integrating cavity. It is believed that the improved reflectivity is attributed to the multiple interfaces between the reflector materials and the surrounding media, the ultra-pure nature of the reflector materials, and the high transmission across the ultraviolet and visible spectrum. It is believed this process produces material having improved diffuse reflectivities over conventional materials since any impurities in the silicon-based materials can lead to absorption and a critical degradation of the performance of the reflector material when the light makes many reflections back and forth across the impurity allowing for a much greater chance of absorption of the light.

Figure 3:
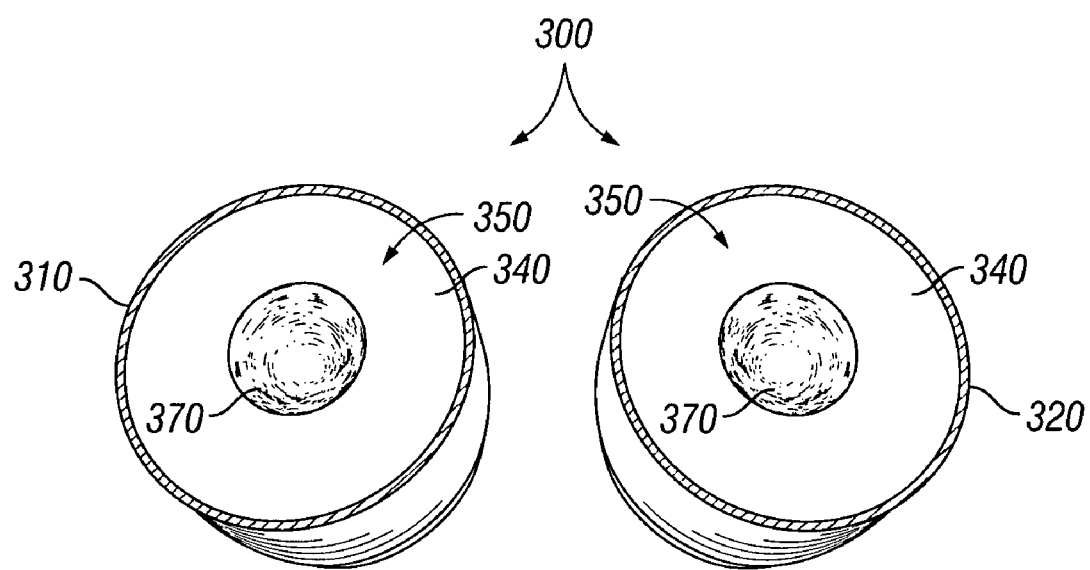
FIG. 3 is a perspective schematic view of one embodiment of an integrating cavity formed with the materials and processes described herein.
Figure 4:
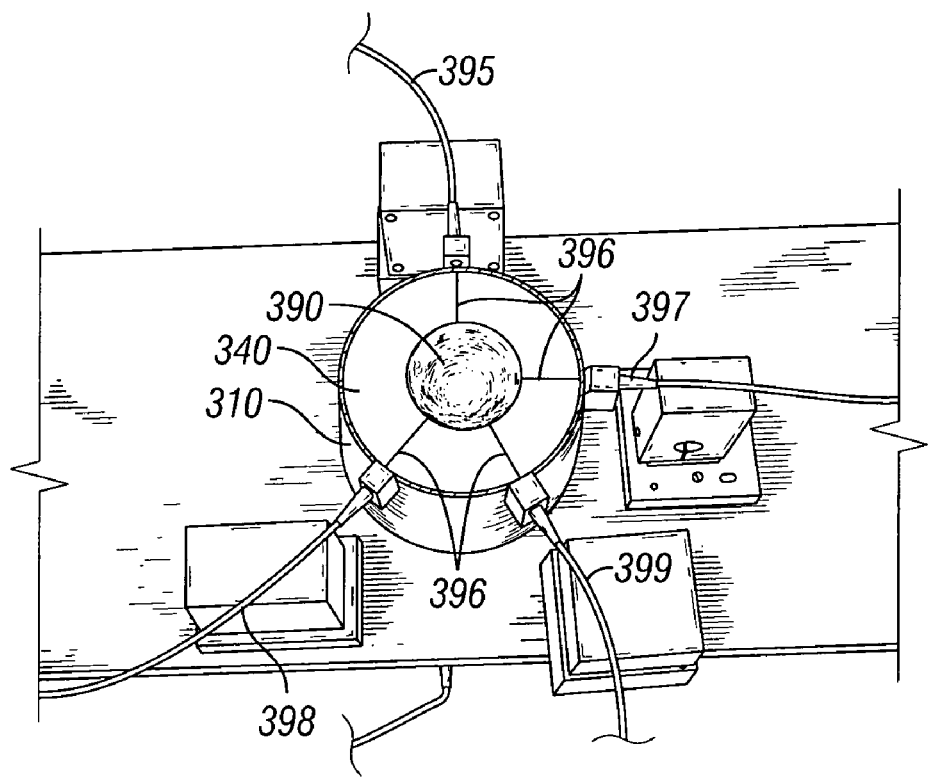
FIG. 4 is a perspective schematic view of another embodiment of an integrating cavity formed with the materials and processes of the present invention.

Referring to FIGS. 3 and 4, in one embodiment of the invention, the diffuse reflective material formed by the processes described herein may be used to form an integrated cavity diffuse reflector 300. An integrated cavity diffuse reflector 300 may be formed by using two or more vessels, such as vessels 310, 320, to form the cavity 350 and disposing the reflective material 340 formed by the processes described herein in the cavity 350 between the vessels 310, 320. The vessels may have a size of up to one meter in diameter for a sphere or radius and/or length for a cylindrical shape. The vessels may have a wall thickness between about 0.25 inches and about 2 inches, and may vary based on the actual size of the reflector to be manufactured. The vessels may further have one or more apertures formed therein for providing flow of materials therein, providing light therein, or sensors/detectors for processing and/or measuring materials disposed therein. The vessels 310, 320, may comprise a transmissive material, such as quartz, fumed silica, and combinations thereof. Preferably, the materials forming the cavity walls, the vessels, which support and hold the diffuse reflective materials such as treated fumed silica, is that they be highly transmissive as defined herein in the wavelength of interest for the device, such as quality quartz glass. The use of the transmissive vessels is believed to provide mechanical support while allowing high transmission of light to the reflector materials formed therein.

The vessels may comprise a combined structure that is plate-shaped, a cube or cuboid block (rectangular block, i.e., right rectangular prism), sphere or cylinder among other shapes, and may be in the form of two or more partial structures, such as two half-spheres, two half-blocks, or two half-cylinders, to define the cavity there between when coupled. The transmissive materials may be deposited in the vessels prior to processing or the diffuse reflective materials may be disposed in the vessels following processing as described herein. The diffuse reflective materials 340 are disposed and/or processed in a manner in the vessels to define a cavity 370 at the center of the diffuse reflective materials. The cavity 370 formed by depositing the diffuse reflective material between two vessels can be of any size since the larger the cavity 370, the greater the optical path length becomes, and as such, the design is scaleable.

Examples of a cavity 370 formed from the diffuse reflective materials include depositing the diffuse reflective materials to a thickness between 1 inch (2.54 cm) and 5 inches (12.7 cm) to define cavities between about 1 inch an about 5 inches in size. In particular, examples cavity 370 had a diameter of thickness of between about 1 to 2 inches with material being deposited on the vessels to a thickness of 1 to 2 inches with a total device being 3 to 6 inches in diameter. The cavity 370 formed in the diffuse reflective material may be in the shape of a cube or cuboid block (rectangular block, i.e., right rectangular prism), sphere or cylinder among other shapes. Cavities, and the vessels containing the cavities, of different sizes may be made for the processes to be performed and the above examples are illustrative and should not be construed or interpreted as limiting the scope of the invention. FIG. 3 demonstrates an integrated cavity diffuse reflector having a 2-inch inner diameter cavity in quartz reflector material with 2-inch walls. FIG. 4 illustrates a two-inch cylindrical cavity in the reflector quartz material with one-inch walls. Alternatively, the cavities were formed by pressing the reflector materials formed herein into molds and machining the pressed materials before disposing in the vessels.

In one embodiment of a diffuse reflector and the corresponding process, light is provided to the reflector 300 by a light emitting source (not shown), for example a laser or lamp, such as a Continuum Powerlite Laser model PL9010, coupled to the reflector 300 via optical fiber 395. Translucent materials 396, such as glass tubes, i.e., Thorlabs optical fibers model FT-200-UMT having a 100-micron diameter, are provided to couple the light emitting source to the cavity 390. Light is then reflected on the diffuse reflective material 340 and the cavity light signal output is measured by a second optical fiber 397 coupled to a reflectivity detector (not shown), such as a photomultiplier tube from Hamamatsu, model 1P21. In one example of the reflector, the diffuse reflectivities of the integrated cavity diffuse reflective materials are measured by sending a short laser pulse into the cavity 390 via an optical fiber 395 and measuring the exponential decay of the signal from the cavity 390 (See FIGS. 1 and 2 for examples of decay). A second optical fiber 397 located 90°, as measured from the center of the cavity, of the cavity radius away from the first fiber 395 sampled the radiant energy in the cavity 390 and thus measured the exponential decay of the signal from the cavity 390. Alternatively, multiple light emitting sources or multiple detective optical fibers, as shown as optical fibers 298 and 399, may be used with reflector 300. For a cylindrical cavity diffuse reflector, the light source fiber optic fiber 395 and the detector optic fiber 397 may be disposed around the diameter of the cylinder as indicated above with the ends of the cylinder open for passage of material though the cavity of the cylindrical reflector.

Figure 2:
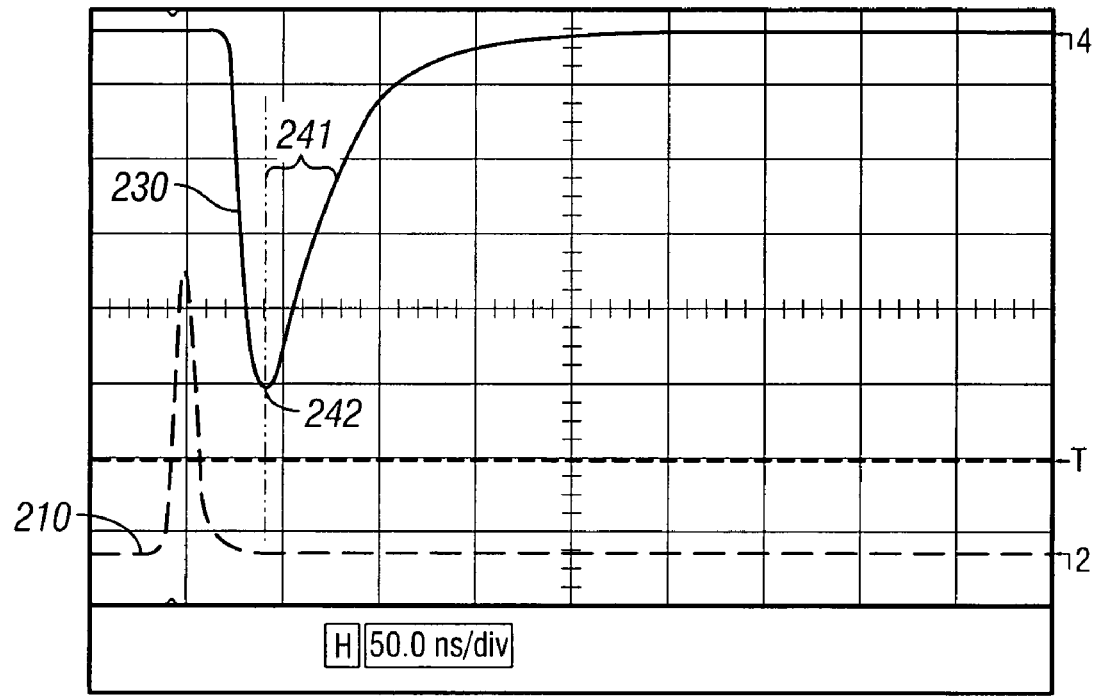
FIG. 2 is chart illustrating another embodiment of laser pulse widths during a laser triggering sequence.

Referring to FIGS. 1 and 2, one example of a quartz integrated cavity diffuse reflector includes a reflector 300 is formed using the Aerosil EG 50 material by the processes described herein in which the material was pressed at about 100 psi at a temperature of about 22° C. The reflector has 5 cm thick walls of the pressed Aerosil EG 50 material surrounding a 5 cm cylindrical cavity in between two half-sphere quartz vessels. The absolute reflectivities of the integrated cavity diffuse reflector were measured by sending a short laser pulse into the cavity via an optical fiber and measuring the exponential decay of the signal from the cavity with the cavity at standard temperature and pressure and atmospheric air. A second optical fiber located 90°, as measured from the center of the cavity, away from the first optical fiber sampled the radiant energy in the reflector 300 and thus measured the exponential decay of the signal from the cavity 390. A 10 nanosecond (ns) pulses at about 532 nm and at about 266 nm, respectively, were introduced to the integrated cavity to measure the reflectivity of the quartz cavities and diffuse reflective material formed therein from fused silica. A reflectivity of about 0.997 for the about 266 nm wavelength and about 0.999 reflectivity for the about 532 nm wavelength were observed. The gathered experimental data for the tested wavelengths on 50.0 ns/divisions charts are shown in FIGS. 1 and 2.

In FIG. 1, the diffuse reflector response at about 532 nm was observed by applying a laser pulse 110, recording the reflector input pulse 120 as it leaves the launching fiber of the laser, and measuring the reflector output pulse 130. The y-axis is an arbitrary representation of the pulses and the x-axis determining the time (widths) 111, 121, 131, of the respective pulses measure along the x-axis in 50 ns divisions. The data correlated to a diffuse reflectivity of about 0.999 over an average of about 1024 pulses from the laser applications (shots). The diffuse reflectivity was calculated using the formula $L(t)=L_0 e^{-t/\tau}$, with $L(t)$, the final radiance, $L_0$ the initial radiance, t representing the time of the cavity output pulse and τ representing the decay constant having an inverse proportional relationship to the reflectivity having the formula $\tau=2D/3c(1-\rho_{ave})$ with D being the diameter of the integrated sphere, c is the speed of light, and ρ, the reflectivity. The symbol, τ, shown as 141 and 241 in the respective figures represents the decay and is the time interval measured from the height of the signal, 142, to the height of the signal when the intensity has dropped to 1/e of its peak value, and the value e equals the inverse of the natural log of 1 and is approximately 2.718. In FIG. 2, the reflector response at about 266 nm was observed by applying a laser pulse 210 and measuring the cavity output pulse 230. The data correlated to a reflectivity of about 0.997 over an average of about 1024 pulse from the laser (shots).

It is believed that when the reflector material, such as fumed silica, as formed herein is incorporated into integrating cavities, the reflector material provides for increased path lengths and interaction times for the light to probe or interact with a material of concern in the integrated cavity diffuse reflector as compared to conventional materials. The increase path lengths and interaction times allow for increased sensitivity in the spectroscopic measurements of trace elements within the reflector. For example, the reflector materials formed herein have been used in forming integrated cavities for obtaining measurements of the absorption of pure water and ocean water. The increased path lengths are also believed to allow for increased effectiveness in close cavity coupling in laser systems.

Figure 5:
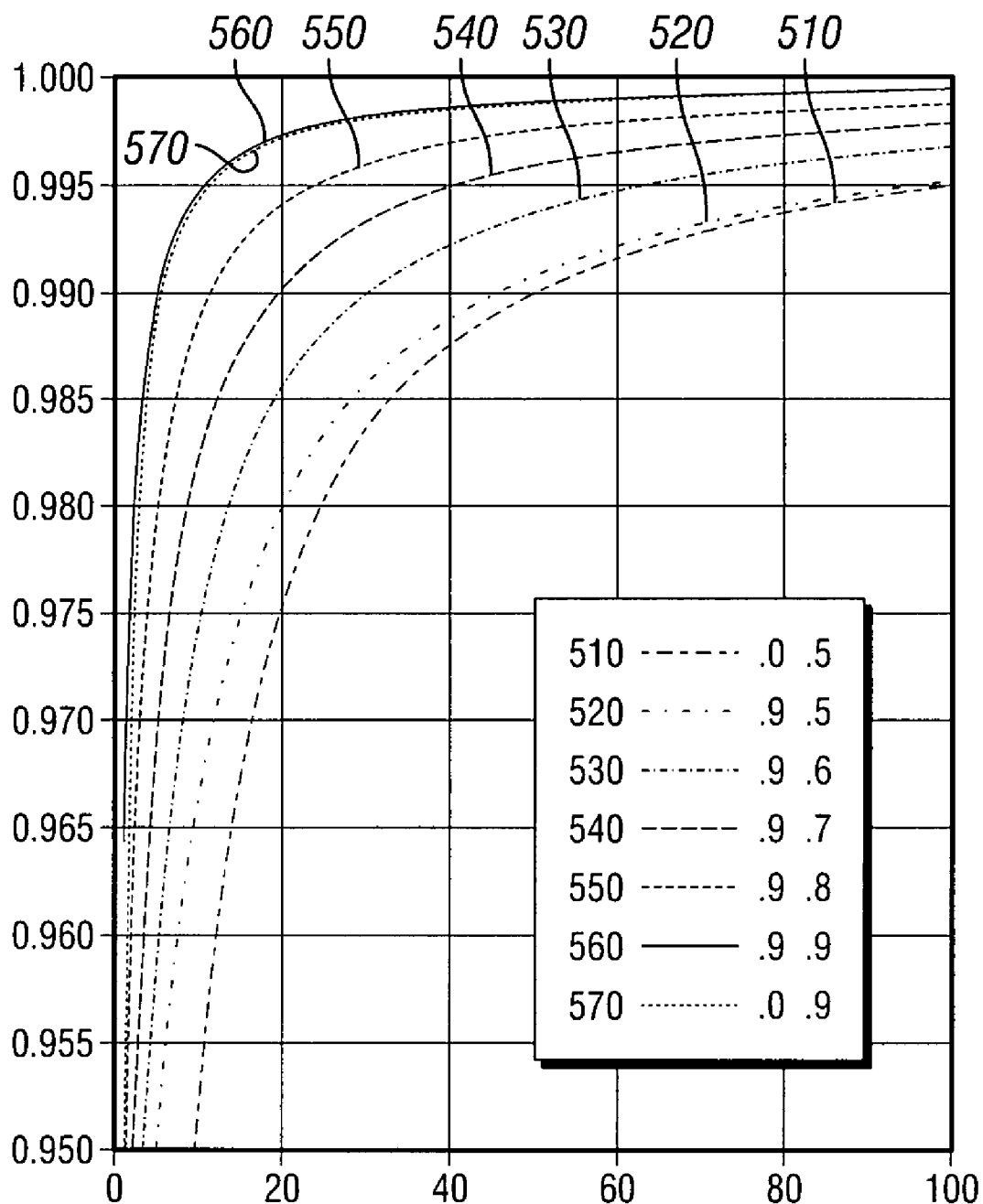
FIG. 5 is a graph illustrating one embodiment of the reflectivity of multiple layers of materials.

FIG. 5 is a graph reflecting the concept that the reflectivity of multiple glass layers with an air (or other media) layer between them could approach 1 as the number of layers grew. The y-axis of the graphs indicates the reflectivity of the material versus the x-axis that represents the numbers of layers. The intervening lines represent various quartz materials 510 to 570 having different optical properties, each quartz material forming a first layer having a reflectivity of 0.5-0.9 with the quartz materials 510 and 570 having a backing layer that allows for no reflectivity (0.0) and quartz materials 520-560 having a backing layer that allows for 0.9 reflectivity. As can be shown, the quartz materials with the higher reflectivity have a multi-layer reflectivity that approaches 1 as the number of layers increase. Surprisingly, it was found, that the backing material did not substantially affect the reflectivity of the quartz materials as shown with quartz materials 560 and 570. As such, the reflector materials formed herein as particles or as a layer of materials may each perform as a "glass" layer allowing increasing reflectivity with increasing amounts of the respective reflector materials.

Figure 6:
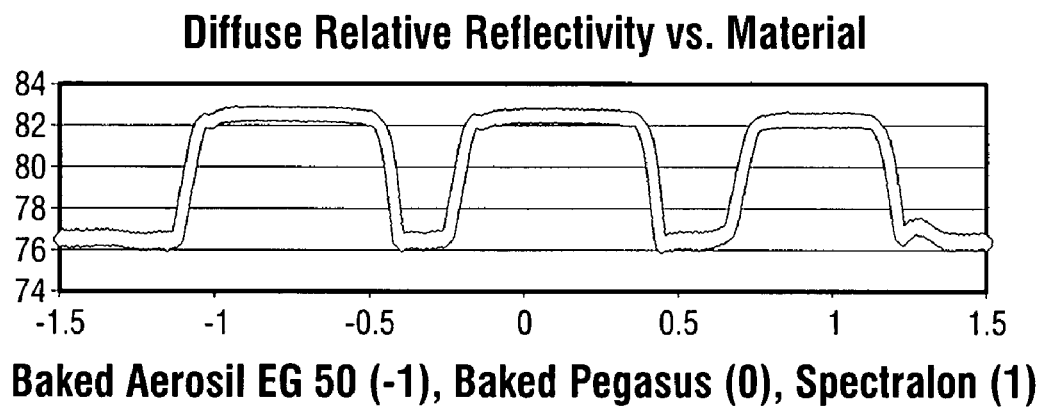
FIG. 6 is a chart illustrating one embodiment of diffuse relative reflectivity versus material.

FIG. 6 illustrates the measuring of the reflections of respective light off a known thickness of material for Aerosil EG 50 (−1 on the x-axis), Pegasus Quartz Powder Material (0 on the x-axis), and Spectralon material (1 on the x-axis). The y-axis is an arbitrary value of the light from a laser signal exiting an integrated cavity diffuse reflector that collects the light reflecting off a disk made from the respective materials with the higher value reflecting a higher diffuse reflectivity. As seen in the graph, the Aerosil EG 50 material and the Pegasus material as processed by the methods described herein produced a higher diffuse reflectivity than the unprocessed Spectralon material.

Figure 7:
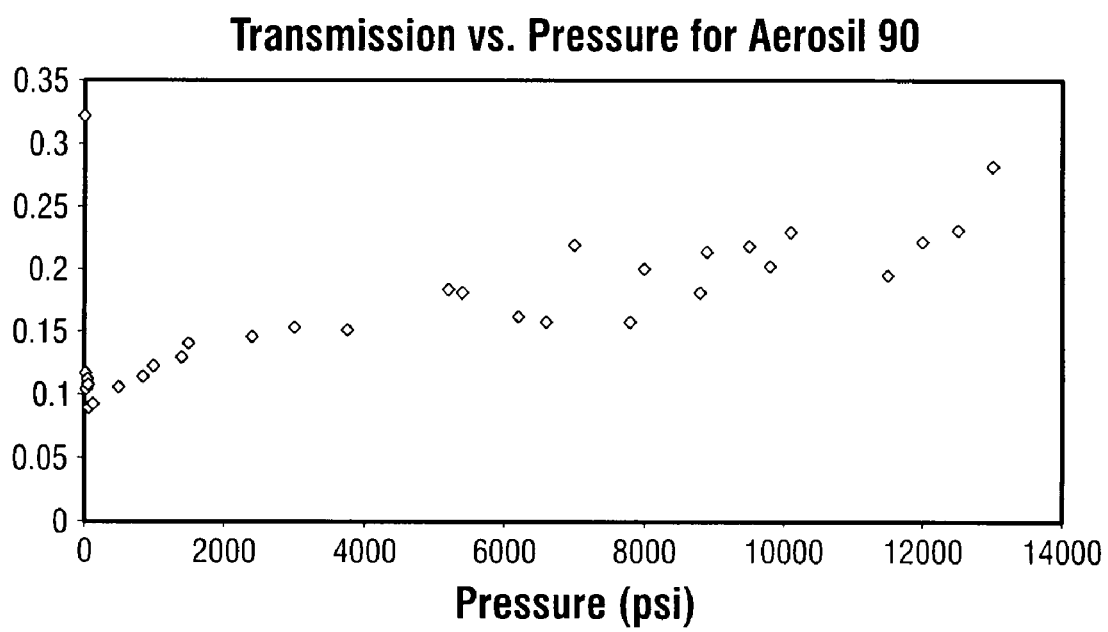
FIG. 7 is a chart illustrating one embodiment of transmission versus processing pressure for one material described herein.

FIG. 7 illustrates reflectivity versus pressure for Aerosil 90 materials formed by the processed described herein at the various pressures. The x-axis is the pressure the Aerosil 90 materials was exposed and the y-axis is the transmission through the respective materials. The lower the transmission, the higher the reflectivity as the reflectivity and transmission are related in an inverse relationship. As can be seen from FIG. 7, the pressure resulting in the lowest transmission and thus, highest diffuse reflectivity are in the range between about 30 psi and about 200 psi.

The reflector material as formed herein may be used to improve the performance of integrating cavities compared to conventional diffuse reflector materials, allowing for sensitive spectroscopic detection of trace elements, or in a close cavity coupling systems, such as solid-state lasers or to couple high power light sources into fibers or other optical elements. For example, the diffuse reflective materials formed by the processes herein may be used in the measurement of the light absorption of pure water from 250-600 nm, such as an in situ device to measure the light absorption of ocean waters, for example, in devices used to measure the backscattering coefficient in ocean waters. Measurement of the materials may be performed by introduction of the materials into the respective cavities, i.e., spherical or cylindrical cavities, are exposure to the light emitting source as described herein with the material being measured by the detectors described herein.

For example, an integrating cavity absorption meter made from Aerosil 90 material powder by the process as described herein was used to measure the absorption of ocean water independent of the scattering coefficient and was observed to have improved measuring properties over commercially available units. In such a measuring process, the ocean water flows through a cylindrical quartz tube that is surrounded by two half-cylindrical diffuse reflectors separated by an inner cavity, i.e., a small air gap. Light is introduced into the inner cavity, and reflects between the diffuse reflectors many times establishing a uniform light field. The ratio of the light intensity measured in the quartz tube to the light intensity measured in the air gap is related to the amount of absorption in the ocean water flowing through the quartz tube.

While the foregoing is directed to various embodiments of the invention, other and further embodiments of the invention may be devised without departing from the basic scope thereof and the scope thereof is determined by the claims that follow.

What is claimed is:

1. A diffuse reflector, comprising:
   a first vessel and a second vessel defining a first cavity there between; and
   a diffuse reflective material disposed in the first cavity to define a second cavity at the center of the diffuse reflective material disposed in the first cavity, and the diffuse reflective material comprises a reflectivity of 0.997 or greater at 266 nanometer wavelengths or longer formed from a plurality of transmissive particles having a purity of about 99.8 wt. % or greater and each particle of the plurality of the optically transmissive particles having a surface area of between about 10 $m^2/g$ and about 380 $m^2/g$.

2. The apparatus of claim 1, wherein the first vessel and the second vessel are made of an optically transmissive material selected from the group consisting of quartz, fumed silica, and combinations thereof.

3. The apparatus of claim 1, wherein each vessel is in the form of a half-spherical shape or a half-cylindrical shape.

4. The method of claim 1, wherein the second cavity comprises a sphere, a cylinder, a cube, or a cuboid shape.

5. The apparatus of claim 1, wherein the diffuse reflective material is formed by exposure of the plurality of transmissive particles to a pressure between about 30 psi and about 200 psi and a temperature between 500° C. and 1500° C.

6. The apparatus of claim 1, further comprising a first optical fiber disposed between one of the first or second vessels and a light emitting source and a second optical fiber disposed between one of the first or second vessels and a reflective detector.

* * * * *